(12) United States Patent
Yang

(10) Patent No.: US 10,606,081 B2
(45) Date of Patent: Mar. 31, 2020

(54) HEAD-MOUNTED DISPLAY DEVICE

(71) Applicant: GOERTEK TECHNOLOGY CO., LTD., Qingdao, Shandong (CN)

(72) Inventor: Chun Yang, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 62 days.

(21) Appl. No.: 16/065,524

(22) PCT Filed: Nov. 30, 2017

(86) PCT No.: PCT/CN2017/113971
§ 371 (c)(1),
(2) Date: Jun. 22, 2018

(87) PCT Pub. No.: WO2019/080260
PCT Pub. Date: May 2, 2019

(65) Prior Publication Data
US 2019/0285892 A1 Sep. 19, 2019

(30) Foreign Application Priority Data
Oct. 24, 2017 (CN) .......................... 2017 1 1002564

(51) Int. Cl.
*G02B 27/01* (2006.01)
*G02B 27/09* (2006.01)
(Continued)

(52) U.S. Cl.
CPC ......... *G02B 27/0172* (2013.01); *G02B 7/021* (2013.01); *G02B 9/04* (2013.01);
(Continued)

(58) Field of Classification Search
CPC .. G02B 27/0172; G02B 9/04; G02B 27/0955; G02B 7/021; G02B 27/0944
See application file for complete search history.

(56) References Cited

U.S. PATENT DOCUMENTS 5,061,052 A    10/1991   DeJsesus
5,151,823 A *   9/1992   Chen ........................ G02B 3/02
                                                                                      359/565
(Continued)

FOREIGN PATENT DOCUMENTS

CN         101843108 A     9/2010
CN         104280877 A     1/2015
(Continued)

OTHER PUBLICATIONS

KR Office Action dated Jun. 10, 2019 as received in Application No. 10-2018-7016868.
(Continued)

*Primary Examiner* — Vinh T Lam
(74) *Attorney, Agent, or Firm* — Maschoff Brennan

(57) ABSTRACT

There is provided in the present disclosure a head-mounted display device, including: a first positive lens, a second positive lens and a micro-display component arranged coaxially and sequentially, where a light incident surface of the first positive lens is close to a light emergent surface of the second positive lens, and a light incident surface of the second positive lens is close to the micro-display component; the light emergent surface of the second positive lens is a convex Fresnel surface, and the light incident surface of the first positive lens is a planar Fresnel surface. The head-mounted display device provided by the present disclosure can effectively enlarge the field angle and reduce the volume.

20 Claims, 3 Drawing Sheets

(51) Int. Cl.
*G02B 7/02* (2006.01)
*G02B 9/04* (2006.01)

(52) U.S. Cl.
CPC ......... *G02B 27/01* (2013.01); *G02B 27/0944* (2013.01); *G02B 27/0955* (2013.01)

(56) References Cited

U.S. PATENT DOCUMENTS

| | | | |
|---|---|---|---|
| 2005/0174775 | A1 | 8/2005 | Conner |
| 2010/0254001 | A1* | 10/2010 | Jang ................. G02B 30/56 359/479 |
| 2012/0120498 | A1* | 5/2012 | Harrison ............ G06F 3/012 359/630 |
| 2015/0268476 | A1* | 9/2015 | Nonaka ............ G02B 27/0179 345/660 |
| 2016/0062121 | A1* | 3/2016 | Border .............. G02B 5/003 359/630 |
| 2016/0209648 | A1* | 7/2016 | Haddick ............ G06Q 30/02 |
| 2017/0293148 | A1* | 10/2017 | Park .................. B60K 37/00 |
| 2017/0371159 | A1* | 12/2017 | Yoon ................ G02B 27/0172 |
| 2018/0045960 | A1* | 2/2018 | Palacios ............ G02B 27/017 |
| 2018/0088313 | A1 | 3/2018 | Jhang et al. |
| 2018/0114298 | A1* | 4/2018 | Malaika ............ G02B 27/017 |
| 2018/0275392 | A1 | 9/2018 | Song et al. |

FOREIGN PATENT DOCUMENTS

| | | | |
|---|---|---|---|
| CN | 105759424 | A | 7/2016 |
| CN | 106094211 | A | 11/2016 |
| CN | 106501928 | A * | 3/2017 |
| CN | 106526852 | A | 3/2017 |
| CN | 107045196 | A | 8/2017 |
| JP | H05-210054 | A | 8/1993 |
| JP | 2005346539 | A | 12/2005 |
| JP | 2009175597 | A | 8/2009 |
| JP | 2007244246 | A | 9/2009 |
| JP | 2010538313 | A | 12/2010 |
| JP | 2011038330 | A | 2/2011 |
| KR | 10-2006-0129449 | A | 12/2006 |
| WO | 2009/028908 | A2 | 3/2009 |
| WO | 2017/057386 | A1 | 4/2017 |

OTHER PUBLICATIONS

JP Office Action in Application No. 2018-531397 dated Jan. 7, 2020.

* cited by examiner

HEAD-MOUNTED DISPLAY DEVICE

CROSS REFERENCE TO RELATED APPLICATIONS

This application claims priority to Chinese Patent Application No. 201711002564.9 entitled "Head-mounted Display Device" and filed on Oct. 24, 2017, the subject matter of which is hereby incorporated by reference in its entirety.

TECHNICAL FIELD

The present disclosure relates to the technical field of virtual reality, and more particularly, to a head-mounted display device.

BACKGROUND

VR (Virtual Reality) technology is a computer simulation system that can create and experience a virtual world, in which a computer is used to generate a simulation environment, and a user may immerse in the generated simulation environment by means of interactive three-dimensional dynamic vision fused with multi-source information and a system simulation of entity behaviors. With a development of technology, VR head-mounted display devices have been widely applied in various fields, such as games, real estates, tourism, and the like.

SUMMARY

There is provided a head-mounted display device, including:
a first positive lens, a second positive lens and a micro-display component arranged coaxially and sequentially,
where a light incident surface of the first positive lens is close to a light emergent surface of the second positive lens, and a light incident surface of the second positive lens is close to the micro-display component;
the light emergent surface of the second positive lens is a convex Fresnel surface, and the light incident surface of the first positive lens is a planar Fresnel surface.

DETAILED DESCRIPTION

To make the principles and advantages of the embodiments of the present disclosure more comprehensible, the technical solutions in the embodiments of the present disclosure will be described clearly and thoroughly below with reference to the accompanying drawings in the embodiments of the present disclosure. Obviously, the described embodiments are part of the embodiments of the present disclosure, rather than all the embodiments. Based on the embodiments in the embodiments of the present disclosure, all other embodiments obtained by those of ordinary skill in the art without making creative efforts shall fall within the protection scope of the present disclosure.

Figure 1:
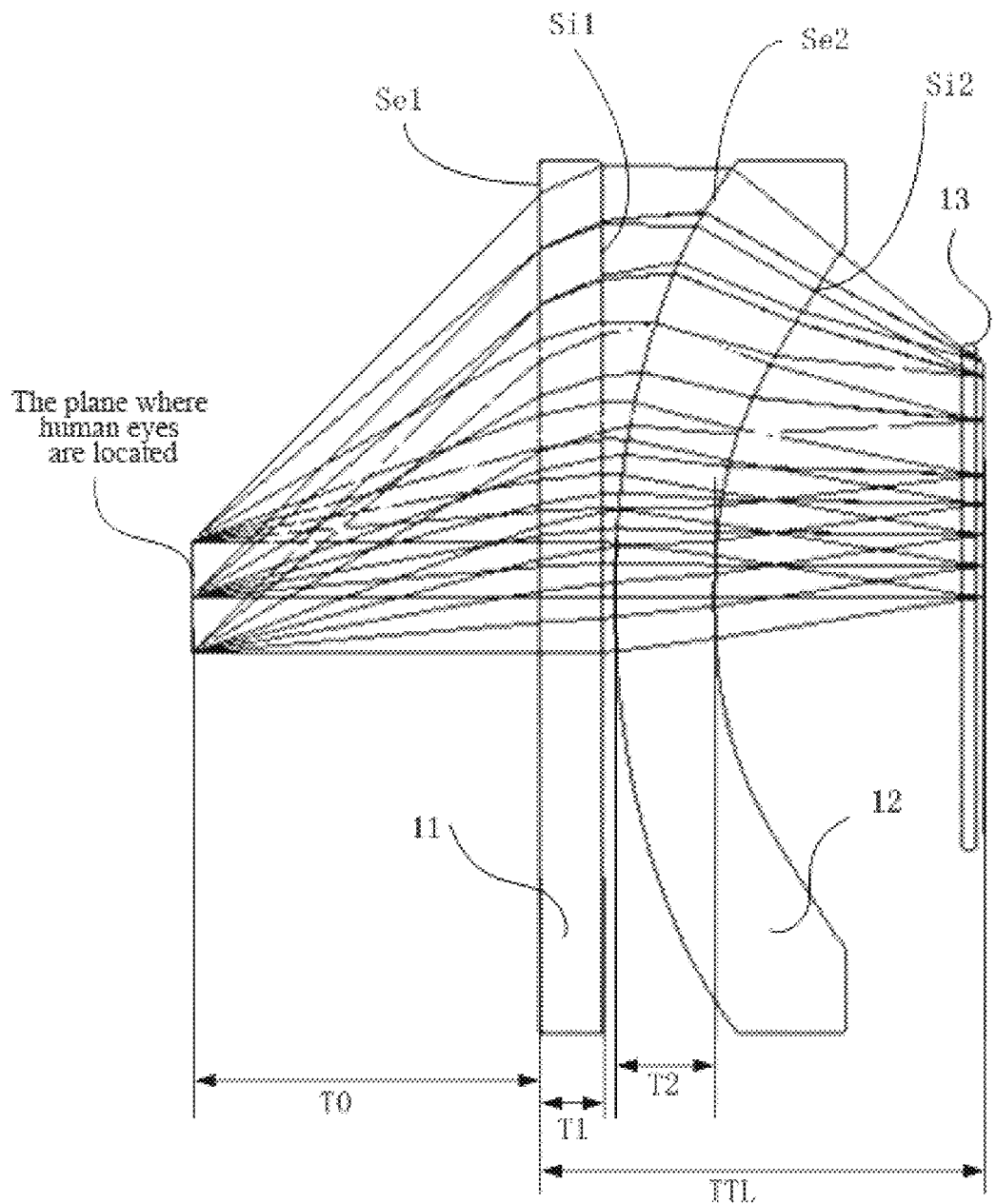
FIG. 1 is a schematic diagram of a structure of a head-mounted display device provided by an embodiment of the present disclosure.

FIG. 1 is a schematic diagram of a structure of a head-mounted display device provided by an embodiment of the present disclosure. As shown in FIG. 1, the device includes:
a first positive lens 11, a second positive lens 12 and a micro-display component 13 arranged coaxially and sequentially, where a light incident surface Si1 of the first positive lens 11 is close to a light emergent surface Se2 of the second positive lens, and a light incident surface Si2 of the second positive lens 12 is close to the micro-display component 13.

Herein, the micro-display component 13 refers to a display device having an effective display area of less than 1 inch, such as LCoS (Liquid Crystal on Silicon), OLED (Organic Light-Emitting Diode), etc. Such display devices generally have advantages of small volumes and light weights. Therefore, the application of a micro-display component in a head-mounted display device can effectively reduce the volume and weight of the head-mounted display device.

In the above structure, the screen light, which is emitted by the micro-display component 13 during its exhibition of images, comes to the light emergent surface Se2 of the second positive lens via the light incident surface Si2 of the second positive lens, and then is deflected into the light incident surface Si1 of the first positive lens by Se2 and refracted into human eyes at a set angle after being reshaped by Si1. As such, the human eyes can see the images exhibited by the micro-display component 13.

Herein, the light emergent surface Se2 of the second positive lens 12 is a convex Fresnel surface. The light emergent surface Se2 plays a role in deflecting light at a large angle, enabling the lights with a large divergence angle and emitted by the micro-display component 13 to come to the light incident surface Si1 of the first positive lens 11 at a large incident height and a small divergence angle. As such, the edge lights and main lights incident upon the light incident surface Si1 have a large opening angle and a small light incident height with respect to human eyes, thereby achieving the purpose of enlarging the field angle.

In an optional implementation, the light emergent surface Se1 of the first positive lens 11 may be a planar diffractive surface. The planar diffractive surface is etched thereon with a certain number of slits, and a width of each slit may be about 1-2 μm. The diffractive surface can mutually compensate the focal power with the refractive surface, so as to reduce the overall chromatic aberration of the system and improve the imaging definition.

In an optional implementation, the light incident surface Si2 of the second positive lens 12 may be a concave aspheric surface. In an aspect, the light incident surface Si2 is designed to be concave, so as to ensure that the second positive lens 12 has a high light collection efficiency, and can receive and transmit most of the screen light emitted by the micro-display component 13 as much as possible. In another aspect, the curvature radius of the concave aspheric surface continuously changes from the center to the edge, thereby accurately controlling the direction of each emergent light, so that the light is deflected and reached the target position on the light emergent surface Se2 of the second positive lens 12.

In some embodiments, after the requirement for the deflection degree of the screen light emitted by the micro-display component 13 is determined, a reverse design may be performed to obtain a concave aspheric surface Si2 having a varying curvature radius. In an optional implementation, in order to ensure the convenience of processing and detection, a surface shape of the light incident surface Si2 may be designed to be an even-order aspheric surface. The surface shape of the light incident surface Si2 may be designed based on the even-order aspheric surface equation, as shown below:

$$z = \frac{cr^2}{1+\sqrt{1-(1+k)c^2r^2}} + \sum_{i=2}^{N} a_i r^{2i}$$

Herein, z is a coordinate along the direction of the optical axis, and r is a radial coordinate along the height direction of the lens; c is a quadratic coefficient related to the curvature of the center point of the aspheric surface, $c=1/r_0$, and $r_0$ is a curvature radius of the center point of the aspheric surface; k is a conic coefficient, and $k=-e^2$; $a_i$ is a coefficient of each even-order term. Optionally, it can be selected that N=4, i.e., the even-order term may be up to the 8th power.

In some embodiments, the surface shape of the light incident surface Si2 may also be designed to be an odd-order aspheric surface. The surface shape of the light incident surface Si2 may be designed based on the odd-order aspheric surface equation, as shown below:

$$z = \frac{cr^2}{1+\sqrt{1-(1+k)c^2r^2}} + \sum_{i=1}^{N} \beta_i r^i$$

Herein, $\beta_i$ is a coefficient of each odd-order term.

As shown in FIG. 1, a distance from the center point of the display screen of the micro-display component 13 to the center point of the light emergent surface Se1 of the first positive lens 11 is defined as TTL (total track length). In the head-mounted display device provided by the present embodiment, as the first positive lens 11 and the second positive lens 12 possess strong light deflecting capability, the TTL may be below 18 mm. Comparing with the existing head-mounted display device, the small TTL in the present embodiment greatly reduces the volume of the head-mounted display device, thus rendering it more portable.

As shown in FIG. 1, after the head-mounted display device provided by the present embodiment is worn by a user, the position of human eyes is the exit pupil position of the optical system. A distance from the center point of the first positive lens 11 to the human eyes is defined as T0. In order to ensure that a user can view better images after wearing the head-mounted display device, the length of T0 may be arranged to satisfy the following condition: 0.7TTL<T0<0.8TTL. Optionally, this length of T0 may be controlled by providing an adjustable supporting component on the head-mounted display device in consideration of different head shapes of different users.

Optionally, a center thickness T1 of the first positive lens 11 may be designed to satisfy the following condition: 0.1TTL<T1<0.2TTL; a center thickness T2 of the second positive lens 12 satisfies the following condition: 0.2TTL<T2<0.3TTL; a focal length F of the device satisfies the following condition: 0.8TTL<F<0.9TTL. Optionally, a Fresnel curvature radius R of the light incident surface Si1 of the first positive lens 11 may be designed to satisfy the following condition: −2F<R<−F; the first positive lens 11 has a focal length F1 smaller than 2F, and the second positive lens 12 has a focal length F2 greater than 2 F. For example, after repeated optimization, when the pixel dimension of the display chip of the micro-display component 13 is 8.64 um, it can be selected that F=14.5 mm, F1=25.8 mm, and F2=34.3 mm.

In some embodiments, the above-mentioned structure and parameter design may enable the optical system of the head-mounted display device to have a half-field angle θ of up to 90 degrees, i.e. tan θ ranges from 0.95 to 1.05. As such, when wearing a head-mounted display device to watch virtual scenes, a user may have strong senses of immersion and reality.

In an optional implementation, when processing the first positive lens 11 and the second positive lens 12, plastic materials may be selected. Plastic materials can be easily processed and have light mass, which lays a foundation for the miniaturization of head-mounted display devices. Here, a refractive index n1 and a dispersion v1 of the first positive lens 11 satisfy the following conditions: 1.5<n1<1.55, and 55<v1<60; a refractive index n2 and the dispersion v2 of the second positive lens 12 satisfy the following conditions: 1.5<n2<1.55, and 55<v2<60. Optionally, in the actual processing, a K26R type plastic material is selected to process the first and second positive lenses in some embodiments. The K26R type plastic material has a refractive index of 1.535 and a dispersion of 55.6.

In some embodiments, two positive lenses are employed as the eyepieces of the head-mounted display device for viewing the virtual scenes presented by the micro-display component, where the light emergent surface of the second positive lens close to the micro-display component is a convex Fresnel surface capable of deflecting screen light refracted thereon into small-angled lights irradiating on the light incident surface of the first positive lens close to human eyes. The light incident surface of the first positive lens is a planar Fresnel surface capable of reshaping the screen light refracted thereon by the second positive lens and refracting it to the human eyes at a set angle. In the above structure, the eyepiece may cooperate with the micro-display component to achieve a short axial distance and a field angle of about 90 degrees, which effectively enlarges the field angle of the head-mounted display device and reduces the volume thereof at the same time. Secondly, the lens shapes of the first and second positive lenses are easy to be processed and molded, which satisfy the design requirements of ultra-thin, large field angle and no chromatic aberration. Furthermore, the eyepiece consisting of two lenses has simple structure and low production costs. In addition, in some embodiments, the light emergent surface of the first positive lens is a diffractive surface. The negative chromatic aberration of this chromatic aberration well corrects the chromatic aberration of the overall optical system, so that the optical system has an excellent imaging quality, and images are clear.

In the following section, a specific example will be provided to explain in detail the optical system of the head-mounted display device provided by the embodiment of the present disclosure with reference to Tables 1 and 2. Table 1 shows a possible design result. In Table 1, Surface represents optical surfaces numbered sequentially from human eyes to the display screen, Type represents the surface shape of each optical surface, C represents the curvature of each optical surface, T represents the distance between each optical surface and the subsequent optical surface, Glass represents the material of each optical surface, Semi-Diameter represents the aperture of each optical surface, and Conic represents the quadratic curved surface constant.

TABLE 1

| Surface | Type | C | T | Glass | Semi-Diameter | Conic |
|---|---|---|---|---|---|---|
| 1 | Plane | | 14.000 | | 2.25 | 0.00E+00 |
| 2 | Diffractive surface | | 2.500 | K26R | 16.43 | 0.00E+00 |
| 3 | Planar Fresnel surface | −15.868 | 0.500 | | 17.57 | −4.73E−01 |
| 4 | Spherical Fresnel surface | 39.815 | 4.000 | K26R | 17.52 | 2.53E+00 |
| 5 | Aspheric surface | 28.527 | 10.000 | | 14.06 | 2.83E+00 |
| 6 | Plane | | 0.500 | BK7 | 10.15 | 0.00E+00 |
| 7 | Plane | | 0.325 | | 9.93 | 0.00E+00 |
| 8 | Plane | | 0.000 | | 9.49 | 0.00E+00 |

In Table 1, Surface 1 is the plane where human eyes are located, Surface 2 is the light emergent surface Se1 of the first positive lens 11, Surface 3 is the light incident surface Si1 of the first positive lens 11, Surface 4 is the light emergent surface Se2 of the second positive lens 12, Surface 5 is the light incident surface Si2 of the second positive lens 12, Surface 6 is the light emergent surface of the protective glass of the micro-display component 13, Surface 7 is the light incident surface of the protective glass of the micro-display component 13, and Surface 8 is the display screen of the micro-display component 13.

As shown in Table 1, in a feasible design manner, a thickness of the first positive lens 11 is 2.5 mm, a distance from the center point of its light emergent surface Se1 to human eyes is 14 mm, and a Fresnel curvature radius of the light incident surface Si1 is −15.868 mm. A thickness of the second positive lens 12 is 4 mm, a Fresnel curvature radius of the light emergent surface Se2 is 39.815 mm, a distance from the center points of the light emergent surface Se2 to the light incident surface Si1 is 0.5 mm, and a curvature radius of the center point of the light incident surface Si2 is 28.527. A distance from the light incident surface Si2 to the display screen of the micro-display component 13 is 10 mm, a thickness of the protective glass of the display screen is 0.5 mm, and a thickness of the display screen is 0.352 mm.

In such a design, the TTL of the optical system is: TTL=2.5+0.5+4+10+0.5+0.325=17.825 mm, so the axial length is greatly reduced with respect to the prior art.

In the present design, even-order aspheric surface coefficients $\alpha_2$, $\alpha_3$ and $\alpha_4$ are shown in the following table:

TABLE 2

| Surface | $\alpha_2$ | $\alpha_3$ | $\alpha_4$ |
|---|---|---|---|
| 1 | 0.00E+00 | 0.00E+00 | 0.00E+00 |
| 2 | 4.69E−07 | −8.22E−08 | 1.55E−10 |
| 3 | 0.00E+00 | 0.00E+00 | 0.00E+00 |
| 4 | 0.00E+00 | 0.00E+00 | 0.00E+00 |
| 5 | 3.79E−06 | −8.68E−08 | 5.66E−10 |
| 6 | −2.17E−05 | −2.18E−07 | −5.66E−09 |
| 7 | −1.89E−05 | −6.04E−07 | −1.73E−09 |
| 8 | 7.84E−05 | −2.65E−06 | 4.04E−08 |

Based on the above design, the imaging quality of the designed optical system can be analyzed by drawing MTF (Modulation Transfer Function) curves, optical field curvature, distortion graphs, spot diagrams and the chromatic aberration graphs.

Figure 2A:
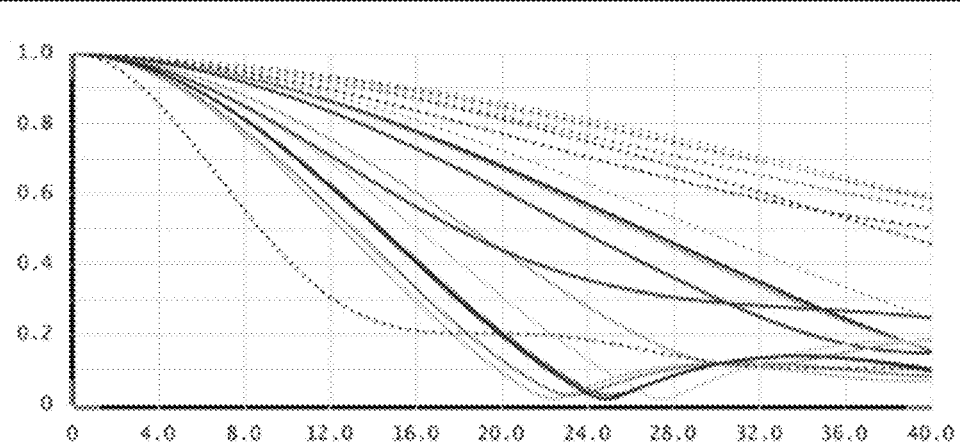
FIG. 2A is a schematic diagram of MTF curves of a head-mounted display device provided by an embodiment of the present disclosure at a limit resolution of a display screen.
Figure 2B:
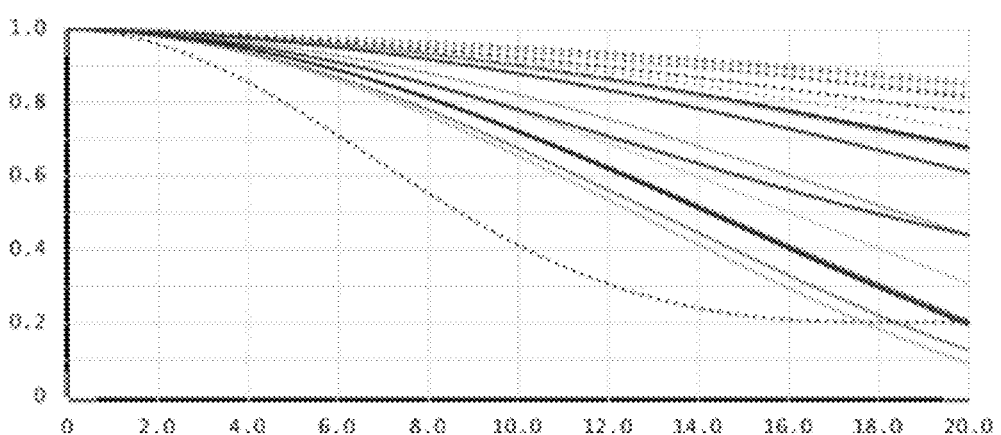
FIG. 2B is a schematic diagram of MTF curves of a head-mounted display device provided by an embodiment of the present disclosure at a ½ limit resolution of a display screen.

FIG. 2A is a schematic diagram of MTF curves of a head-mounted display device provided by an embodiment of the present disclosure at a limit resolution of a display screen, and FIG. 2B is a schematic diagram of MTF curves at a ½ limit resolution of a display screen. In FIGS. 2A and 2B, each color represents each of the field lights, the horizontal coordinate represents a distance from the point on the optical system to the center of the optical system, and the vertical axis represents a percentage of imaging quality close to real object. The MTF is a comprehensive reflection of the imaging quality of the optical system. The smoother the curve shape of the MTF, the higher the height relative to X axis (i.e., closer to 1), the better the imaging quality of the optical system. In FIGS. 2A and 2B, the curves of various colors are relatively smooth and compact, and the MTF values represented by the curves are high. In FIG. 2B, under the condition of ½ limit resolution of the display screen, the MTFs within 0.6 field of view has reached 0.2 or more, which indicates that the aberration of the optical system is well corrected.

Figure 3:
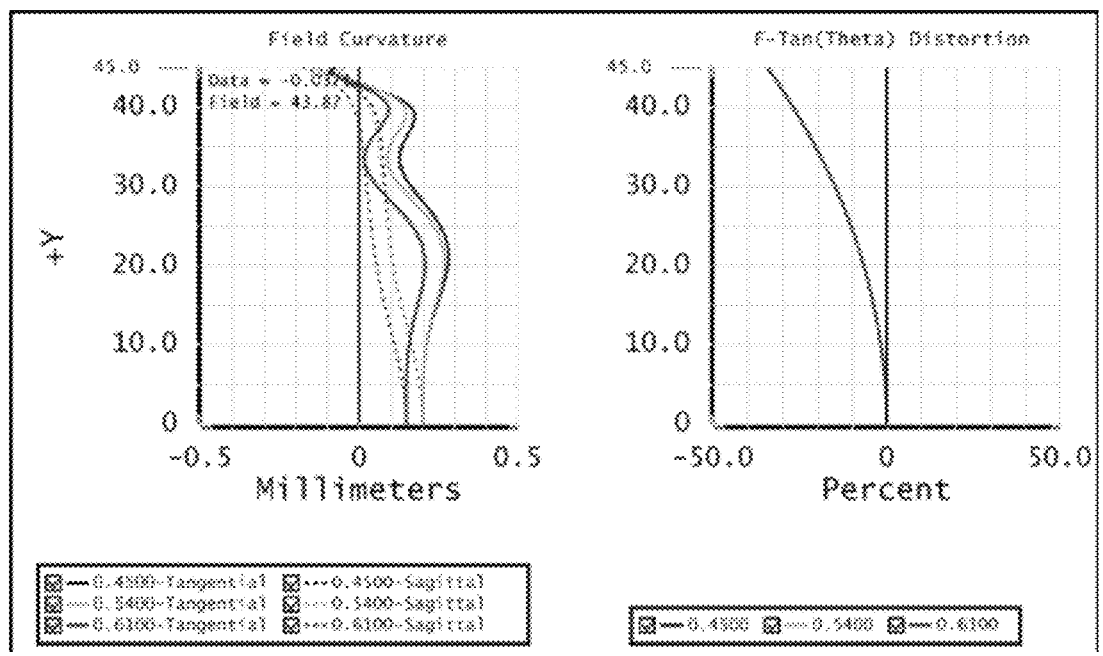
FIG. 3 is a schematic diagram of an optical field curvature and a distortion of a head-mounted display device provided by an embodiment of the present disclosure.

FIG. 3 is a schematic diagram of an optical field curvature and a distortion of a head-mounted display device provided by an embodiment of the present disclosure. The left diagram of FIG. 3 illustrates the field curvature, in which different colors represent different wavelengths, the solid line represents the tangential field curvature, the dotted line represents the sagittal field curvature, and the astigmatism of the optical system may be obtained by the subtraction of the above two field curvatures. The astigmatism and field curvature are significant aberrations affecting off-axis field lights. An excessively large astigmatism may seriously affect the imaging quality of the off-axis lights of the system, and the field curvature may lead to the situation that the optimum imaging of the center and edges are on different planes. As can be seen from the left diagram of FIG. 3, both the field curvature and the astigmatism of the optical system provided by the present embodiment are corrected to be within a range of 0.5 mm. As can be seen from the right diagram of FIG. 3, the distortion (F-Tan(theta) distortion) of the optical system provided by the present embodiment is less than 35%.

Figure 4:
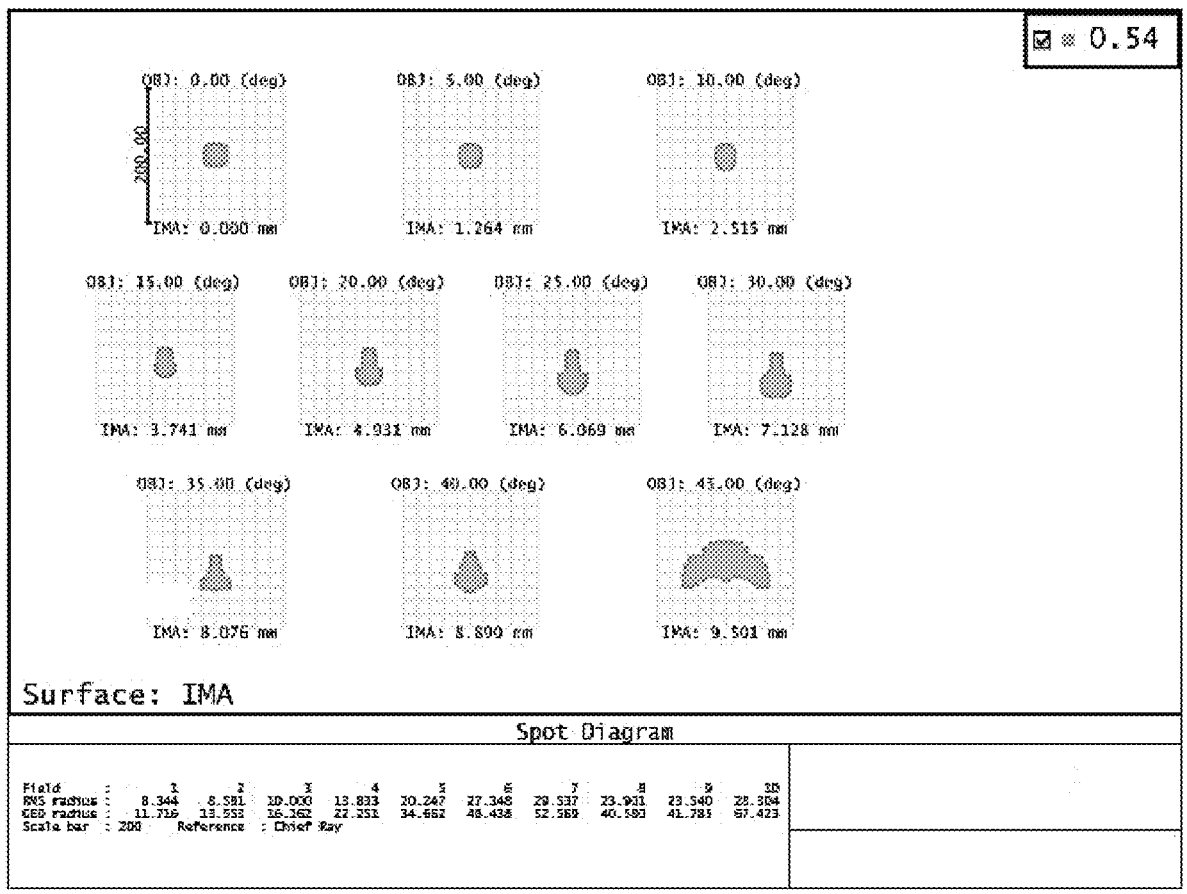
FIG. 4 is a spot diagram of the head-mounted display device provided by an embodiment of the present disclosure.

FIG. 4 is a spot diagram of a head-mounted display device provided by an embodiment of the present disclosure. The spot diagram illustrates dispersion light spots formed by various field lights of the optical system that converge on the image surface. The smaller the radius of the RMS (Root Mean Square) of the spot diagram is, the better the imaging quality of the system is. As can be seen from FIG. 4, RMS diameters of the dispersive light spots of the optical system provided by the present embodiment all are less than 30 μm which indicates that the aberration has been well corrected.

Figure 5:
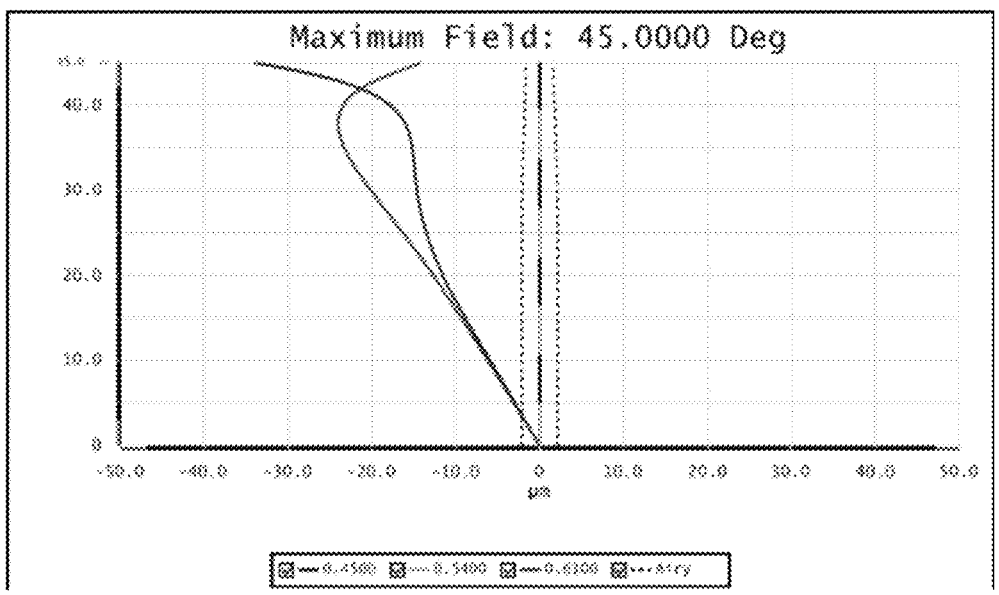
FIG. 5 is a schematic diagram of a system chromatic aberration curve of a head-mounted display device provided by an embodiment of the present disclosure.

FIG. 5 is a schematic diagram of a system chromatic aberration curve of a head-mounted display device provided by an embodiment of the present disclosure. In FIG. 5, the horizontal axis represents the chromatic aberration, and the vertical axis represents the field angle. The deviation of the curve from the vertical axis indicates the change in chromatic aberration, and the greater the deviation is, the greater the chromatic aberration is. In FIG. 5, the maximum half-field angle is 45 degrees, and the chromatic aberration can be controlled to be within a range of 35 μm.

It should be noted that the descriptions of "first" and "second" herein are used to distinguish different messages, devices, modules, etc., and do not represent the sequential order and not define that "first" and "second" are different types.

It should also be noted that the terms "including", "comprising" or any other variations thereof are intended to cover non-exclusive inclusions, so as to make processes, methods, goods or devices which include a series of elements to include not only the series of elements but also other elements that are not explicitly listed, or other elements that are inherent to such processes, methods, goods or devices. In the case of no more limitation, the element defined by the sentence "including a . . . " does not exclude a case that there are additional identical elements in the processes, methods, goods or devices which include the elements.

The above descriptions are merely some embodiments of the present disclosure and are not intended to limit the present disclosure. It will be apparent to those skilled in the art that various modifications and variations can be made in the present disclosure. Any modification, equivalent substitution or improvement, etc. within the spirit and principle of the present disclosure shall be included in the scope of claims of the present disclosure.

The invention claimed is:

1. A head-mounted display device, comprising: a first positive lens, a second positive lens and a micro-display component arranged coaxially and sequentially, wherein a light incident surface of the first positive lens is close to a light emergent surface of the second positive lens, and a light incident surface of the second positive lens is close to the micro-display component; and the light emergent surface of the second positive lens is a convex Fresnel surface, and the light incident surface of the first positive lens is a planar Fresnel surface.

2. The device of claim 1, wherein a light emergent surface of the first positive lens is a planar diffractive surface.

3. The device of claim 1, wherein the light incident surface of the second positive lens is a concave aspheric surface.

4. The device of claim 1, wherein a distance TTL from a center point of a display screen of the micro-display component to a center point of the light emergent surface of the first positive lens is less than 18 mm.

5. The device of claim 4, wherein:
a distance T0 from a center point of the first positive lens to human eyes satisfies a condition of $0.7 \text{ TTL} < T0 < 0.8 \text{ TTL}$; and
a center thickness T1 of the first positive lens satisfies a condition of $0.1 \text{ TTL} < T1 < 0.2 \text{ TTL}$.

6. The device of claim 4, wherein a center thickness T2 of the second positive lens satisfies a condition of $0.2 \text{ TTL} < T2 < 0.3 \text{ TTL}$.

7. The device of claim 4, wherein a focal length F of the device satisfies a condition of $0.8 \text{ TTL} < F < 0.9 \text{ TTL}$.

8. The device of claim 7, wherein a Fresnel curvature radius R of the light incident surface of the first positive lens satisfies a condition of $-2 F < R < -F$.

9. The device of claim 7, wherein the first positive lens has a focal length F1 smaller than 2 F, and the second positive lens has a focal length F2 greater than 2 F.

10. The device of claim 1, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

11. The device of claim 2, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

12. The device of claim 3, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

13. The device of claim 4, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

14. The device of claim 5, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

15. The device of claim 6, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

16. The device of claim 7, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

17. The device of claim 8, wherein:
a refractive index n1 and a dispersion v1 of the first positive lens satisfy a condition of $1.5 < n1 < 1.55$ and $55 < v1 < 60$; and
a refractive index n2 and a dispersion v2 of the second positive lens satisfy a condition of $1.5 < n2 < 1.55$ and $55 < v2 < 60$.

18. The device of claim 2, wherein at least two slits are etched on the planar diffractive surface, and a width of each slit is 1-2 μm.

19. The device of claim 3, wherein a curvature radius of the concave aspheric surface continuously changes from a center of the concave aspheric surface to an edge of the concave aspheric surface.

20. The device of claim 3, wherein the concave aspheric surface has a varying curvature radius.

* * * * *